(12) United States Patent
Herbiet et al.

(10) Patent No.: US 8,088,311 B2
(45) Date of Patent: Jan. 3, 2012

(54) FLAME RETARDING COMPOSITION WITH MONOMODAL PARTICLE SIZE DISTRIBUTION BASED ON METAL HYDROXIDE AND CLAY

(75) Inventors: Rene Gabriel Erich Herbiet, Eupen (DE); Mario Neuenhaus, Elsdorf (DE); Winfried Toedt, Steffein-Auel (DE)

(73) Assignee: Albemarle Corporation, Baton Rouge, LA (US)

( * ) Notice: Subject to any disclaimer, the term of this patent is extended or adjusted under 35 U.S.C. 154(b) by 796 days.

(21) Appl. No.: 11/573,581

(22) PCT Filed: Aug. 16, 2005

(86) PCT No.: PCT/EP2005/008886
§ 371 (c)(1),
(2), (4) Date: Feb. 12, 2007

(87) PCT Pub. No.: WO2006/018278
PCT Pub. Date: Feb. 23, 2006

(65) Prior Publication Data
US 2007/0246693 A1    Oct. 25, 2007

(30) Foreign Application Priority Data
Aug. 16, 2004  (DE) .......................... 10 2004 039 664

(51) Int. Cl.
C09K 21/00 (2006.01)
C09K 21/02 (2006.01)
(52) U.S. Cl. ........................................ 252/604; 252/609
(58) Field of Classification Search .................... 252/604
See application file for complete search history.

(56) References Cited

U.S. PATENT DOCUMENTS

| | | | |
|---|---|---|---|
| 4,906,300 A | 3/1990 | Rice et al. | |
| 5,319,014 A * | 6/1994 | Moorman et al. | 524/427 |
| 6,624,226 B1 | 9/2003 | Servaty et al. | |
| 6,750,282 B1 * | 6/2004 | Schall et al. | 524/445 |
| 2004/0147029 A1 * | 7/2004 | Adam | 436/8 |

FOREIGN PATENT DOCUMENTS

| | | |
|---|---|---|
| EP | 0 516 299 A | 12/1992 |
| JP | H05-117658 A | 5/1993 |
| JP | 2002-220549 A | 8/2002 |
| WO | WO 0068312 A1 * | 11/2000 |
| WO | WO 03/082965 A | 10/2003 |
| WO | WO 2005/100245 A | 10/2005 |

* cited by examiner

*Primary Examiner* — Peter F Godenschwager
(74) *Attorney, Agent, or Firm* — James A. Jubinsky

(57) ABSTRACT

The invention relates to a flame retarding composition that comprises a mixture of a metal hydroxide component and a clay component, the mixture being present in the form of dried particles with monomodal particle size distribution.

14 Claims, 3 Drawing Sheets

Particle size distribution of the filler composition not according to the invention Particle size distribution of the filler composition according to the invention Spray-dried ATH/nanoclay mixture (ATH: OL-10/LS from Martinswerk GmbH, nanoclay: Nanofil 5 from Süd-Chemie)

FLAME RETARDING COMPOSITION WITH MONOMODAL PARTICLE SIZE DISTRIBUTION BASED ON METAL HYDROXIDE AND CLAY

The present invention relates to a flame retarding composition based on a mixture of a metal hydroxide component and a clay component.

In the field of flame retarding, materials such as polymer materials are made flame-retardant using flame retarding agents such as for example metal hydroxides, in particular aluminium hydroxides and magnesium hydroxides. The flame retarding agents are used alone or in combination with one another, metal hydroxides in particular being able to be used together with further inorganic flame retarding additives but also organic halogen-containing flame retarding additives.

It is also known to use the metal hydroxide flame retarding components, which are also called "mineral flame retarding components", with clay materials, here in particular with organically modified phyllosilicates (so-called nanoclays), jointly in for example polymer materials for flame retarding, resulting in flame retarding properties that are improved compared with the use of the mineral flame retarding components alone.

The mix of for example metal hydroxides and clay (in particular with organically modified phyllosilicates, so-called nanoclays) has up to now taken place as a rule during the preparation of the mixture using conventional machines customary in the plastic and rubber industries such as for example internal mixers, Buss Ko-kneaders, roll mills or single- or twin-screw extruders. This conventional in-situ mixing technique has for example been used in WO 00/68312 and WO 00/66657. It is disadvantageous that here (at least) two different raw materials must be stored, conveyed, dosed and mixed into the polymer (plastic or rubber). Alternatively a powder mix can be prepared in mechanical mixers such as e.g. Henschel mixers. A disadvantage of this mechanical mixing process is firstly the additional cost factor due to the necessary mixing step. Secondly, mechanical mixing does not as a rule prevent the occurrence of a bimodal particle size distribution which is in most cases formed by a simple overlaying of the individual particle size distributions of the powder constituents used. Such a bimodal particle size distribution can in turn lead to unwanted processing behaviour during the later plastic mixture preparation. Also, the risk of demixing after a mechanical mixing process during further processing or storage is much higher if there is a bimodal particle size distribution.

Figure 1:
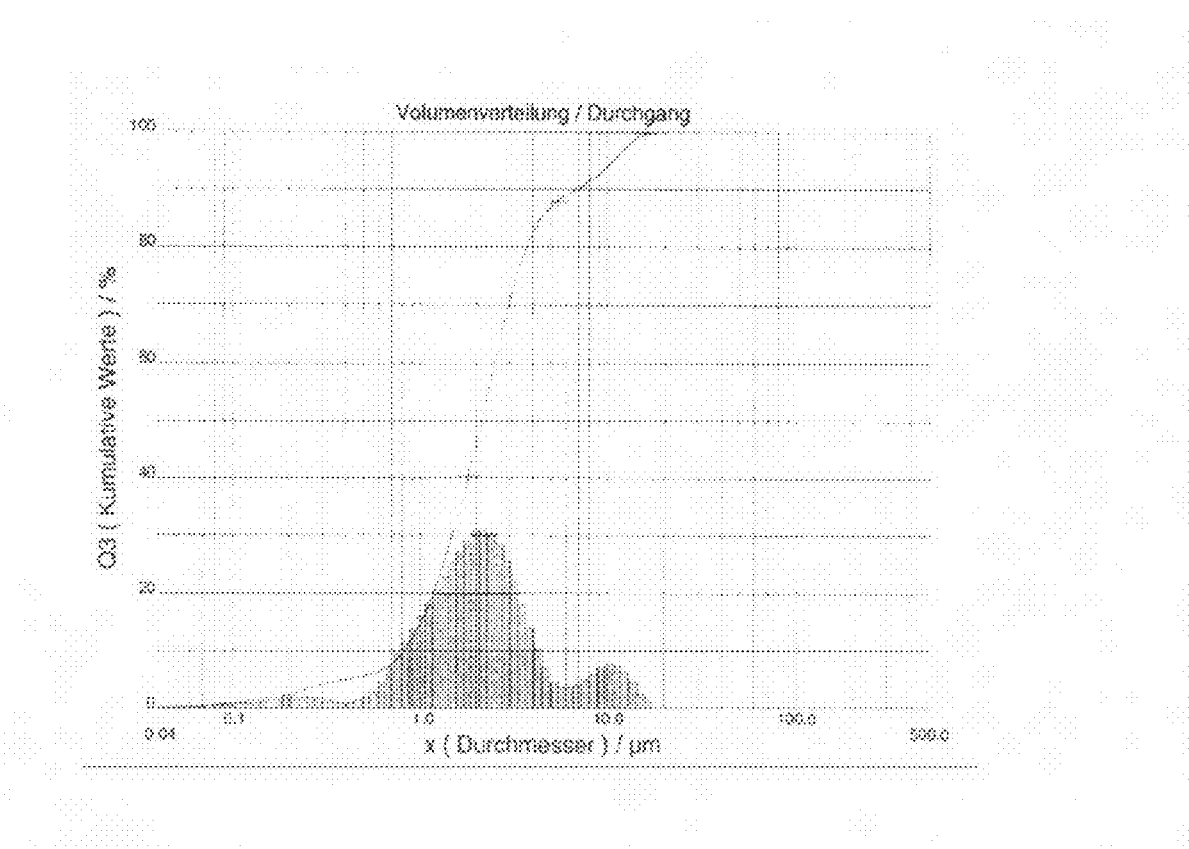
FIG. 1 shows the particle size distribution of a filler mix not according to the present invention.

Therefore the present invention relates to an effective flame retarding composition which also comprises a clay component in addition to a mineral metal hydroxide component, which is characterized in that the composition has a monomodal particle size distribution. The inventors hereof believe that a demixing of these components in the composition after the mixing process during subsequent use or storage is very largely avoidable, the composition causes no processing problems, and moreover can be prepared at favourable cost.

Further aspects of the invention include the preparation of this composition and its use in polymer materials or the polymer materials made flame retardant therewith.

The composition according to the invention can be prepared according to a process that is characterized in that the metal hydroxide component is firstly transformed into a pumpable aqueous suspension together with the clay component and optionally by means of a suitable wetting auxiliary or dispersant and the slurry is then dried by spray drying or a process in which heated air or another heated gas is used for drying, in particular mill drying or vortex (or fluidized) drying.

It was surprising to see that as a result of the introduction of the metal hydroxide and clay components in water and for example subsequent spray drying a biomodal particle size distribution can be avoided and thus a demixing of the metal hydroxide and clay components effectively prevented.

The subsequent handling of such a monomodal dried composition protected against demixing is clearly simpler and more cost-favourable. It also leads to a more uniform mixing and distribution of the flame retarding materials in each material to be flameproofed.

The metal hydroxide component of the flame retarding composition according to the invention preferably comprises one or more of aluminium or magnesium hydroxides, such as for example AlO(OH), Al(OH)$_3$(ATH) and/or Mg(OH)$_2$ (MDH) and in particular boehmite, ATH or MDH, individually or in any mixture of the same.

The clay component of the flame retarding composition according to the invention preferably comprises at least one so-called nanoclay which is selected in particular from bentonite and hectorite or modified, in particular organically intercalated, materials prepared therefrom. Various clay materials can also be mixed here.

In the flame retarding compositions according to the invention, the clay component content lies, based on the weight of the composition, in the range from 0.5 to 90%, preferably 1% to 30%, particularly preferably 3% to 20%, in particular 5% to 10%.

During the preparation of the flame retarding composition, the metal hydroxide component is used in the form of particles with a $d_{50}$ value typically in the range from 0.2 μm to 100 μm, preferably in a range from 0.5 μm to 30 μm, in particular in a range from 0.7 μm to 5 μm.

In contrast the $d_{50}$ value of the particles of the clay component used in the preparation of the mixture typically lies in the range from 0.2 μm to 100 μm, preferably in a range from 1.0 μm to 30 μm, in particular in a range from 1.0 μm to 10 μm.

The particle sizes are determined by laser diffraction. A suitable measurement apparatus is for example a Cilas 1064 L laser spectrometer from Quantachrome.

The flame retarding composition according to the invention can be prepared by first producing a viscous cake from the metal hydroxide component and water. Such a cake can, if it has a viscosity that makes further processing difficult, be modified with the aid of suitable wetting agents or dispersants such that the viscosity of the cake is so low that it can be easily processed. Non-limiting examples of suitable dispersants are anionic, cationic, electroneutral, amphoteric and non-ionogenic dispersants and organic acids. Salts of polyacrylic acid, formic acid or acetic acid for example are preferred. They can be used in the typical amounts, for example in an amount of 0.01 to 5 wt.-%, preferably of 0.05 to 1 wt.-%, particularly preferably 0.1 to 0.5 wt.-%, based on the solids content of the metal hydroxide component.

For example such a viscous cake contains 30 to 85 wt.-%, preferably 35 to 65 wt.-%, more preferably 45 to 55 wt.-% water. By adding dispersant, for example an ammonium salt of polyacrylic acid in an amount of for example 0.01 to 5 wt.-%, preferably 0.05 to 1 wt.-%, particularly preferably 0.1 to 0.5 wt.-%, based on the solids content of the metal hydroxide component, a substantial liquefaction can be achieved if necessary, so that at the end a more easily pumpable and more easily dryable slurry is formed.

Such a slurry is then mixed with the desired clay component. The mixing-in of the clay component can optionally be supported by using suitable dispersants. Basically suitable dispersants are again anionic, cationic, electroneutral, amphoteric and non-ionogenic dispersants and organic acids. Preferred dispersants are for example salts of polyacrylic acid, formic acid or acetic acid. They can be used in the typical amounts, for example in an amount of 0.01 to 5 wt.-%, preferably of 0.05 to 1 wt.-%, particularly preferably 0.1 to 0.5 wt.-%, based on the solids content of the clay component. Overall a pumpable slurry, that can be processed for example by means of spray drying, forms from the metal hydroxide component and the clay component. The mixing-in of the clay component takes place using a stirrer customary in the trade until a visibly homogeneous distribution is achieved. Typical stirring times are about 10 to 30 minutes.

The dried particles of the flame retarding composition prepared according to the invention, which are preferably present in the form of a free-flowing powder, preferably have for example a $d_{50}$ value in the range from 0.2 µm to 100 µm, preferably in a range from 0.5 to 10 µm, in particular in a range from 0.7 µm to 5 µm.

Drying preferably takes place in spray towers customary in the trade, such as for example are obtainable from Niro. Air, the quantity and temperature of which are advantageously such that it has an exit temperature of 100 to 150° C., is preferably used as drying gas.

Drying is advantageously carried out such that the solids content of the slurry lies between 15 and 70 wt.-%, preferably between 35 and 65 wt.-%, more preferably between 45 and 55 wt.-%. This can optionally be achieved by using the above-mentioned dispersants in the amounts also mentioned above.

Alternatively a drying can also take place by other customary processes in which heated air or other gases are used for drying, for example mill drying processes, vortex (or fluidized) processes and others.

The flame retarding achieved by means of a composition according to the invention is in no way inferior to the effects which are achieved when using known mixing processes, e.g. when applying mechanical mixing or in-situ mixing, i.e. the mixing of a metal hydroxide component and a clay component with a polymer to be made flame retardant during the preparation of a flame retarding mixture for example in an internal mixer or Buss Ko-kneader. This can for example be shown with the help of the cone calorimeter data or the UL 94 V data.

The composition according to the invention can be introduced into a material to be made flame retardant, such a material preferably consisting of a thermoplastic or thermosetting polymer material which is in particular selected from polyolefins, polyesters, polyamides, polyvinyls and polyethers, homo-, co- and terpolymers of the same and also mixtures of such polymers being included in each case. Preferred polymers are for example ethylene/vinyl acetate copolymers (EVA), ethylene/acrylate copolymers or -/methacrylate copolymers which have $C_1$ to $C_4$ alkyl groups, for example ethylene/methyl acrylate copolymers, ethylene/ethyl acrylate copolymers and ethylene/butyl acrylate copolymers or the corresponding methacrylate copolymers. Polyvinyl chloride and rubber are also suitable.

The correspondingly flame retarded polymer is in turn characterized in that it comprises a flame retarding composition according to the invention or has been prepared using such a flame retarding composition.

The amount of flame retarding composition used lies, depending on the polymer, in the range from 20 phr to 300 phr, preferably in the range from 50 phr to 250 phr, in particular from 70 phr to 220 phr, relative to 100 parts (phr) of the polymer material. "phr" means "parts per hundred parts polymer".

The flame retarding composition according to the invention can, in addition to the metal hydroxide and clay components, additionally also contain up to about 150 phr of other known flame retardant additives, in particular halogen-containing flame retardant additives (mostly in combination with antimony trioxide), phosphorus or organic phosphorus compounds or also nitrogen-containing flame retarding additives (such as e.g. melamine cyanurate).

The following examples illustrate the invention.

The given particle groups were measured by laser diffraction using a Cilas 1064 L laser spectrometer from Quantachrome, the procedure being as follows. Firstly a suitable water-dispersant solution (preparation see below) is introduced into the sample-preparation vessel of the apparatus. The standard measurement selected in the programme is called "Particle Expert". The measurement model "Range 1" is selected in the programme. Apparatus-internal parameters that apply to the expected particle size distribution are thus chosen. It was also established during the present measurements that the sample is exposed to ultrasound for 60 seconds during the dispersion, but not during the measurement.

After background measurement has taken place, about 75-100 mg of the sample to be analyzed are placed in the sample vessel with the water/dispersant solution and the measurement started.

Preparation of the water/dispersant solution: firstly a concentrate is prepared from 500 g Calgon from KMF Laborchemie with 3 l CAL Polysalt from BASF. This solution is made up to 10 l with deionized water. 100 ml of this is taken and in turn diluted further to 10 l with deionized water.

FILLER COMPARISON EXAMPLE

OL-104/LE aluminium hydroxide from Martinswerk GmbH with a $d_{50}$ value of 1.8 µm and Nanofil 5 nanoclay from Süd-Chemie with a $d_{50}$ value of 8 µm were mixed together for 10 minutes in a FM10C type Thyssen-Henschel mixer in the weight ratio of 9:1 at a rotor speed of 1000 rpm. The particle size distribution of this mixture was then measured with a Cilas 1064 laser spectrometer from Quantachrome. FIG. 1 shows the particle size distribution of the filler mix not according to the invention. Several maxima are clearly seen, in particular in the case of a particle diameter of about 2.1 µm and about 11 µm.

Figure 2:
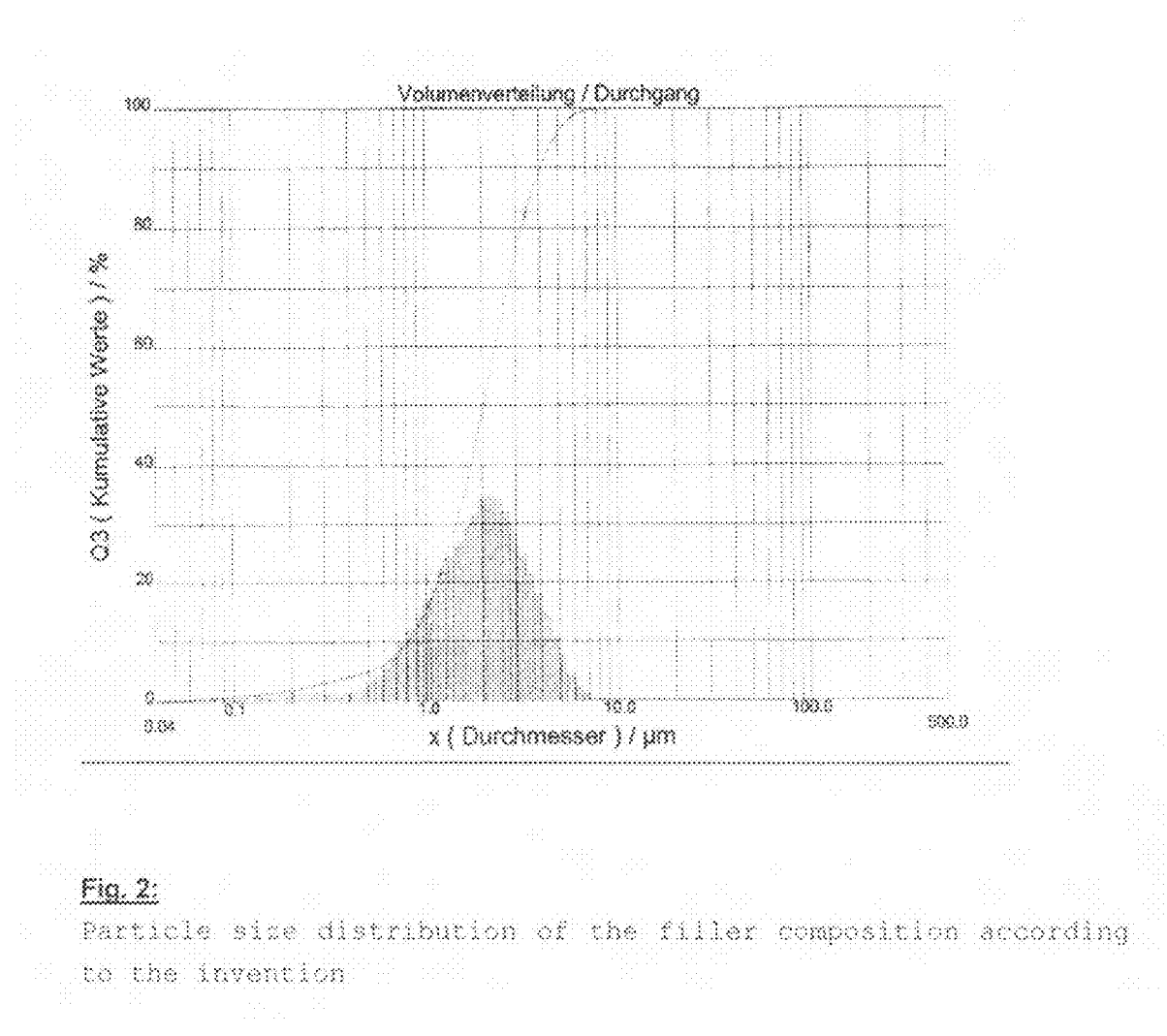
FIG. 2 shows the particle size distribution of a filler mix according to the invention.
Figure 3:
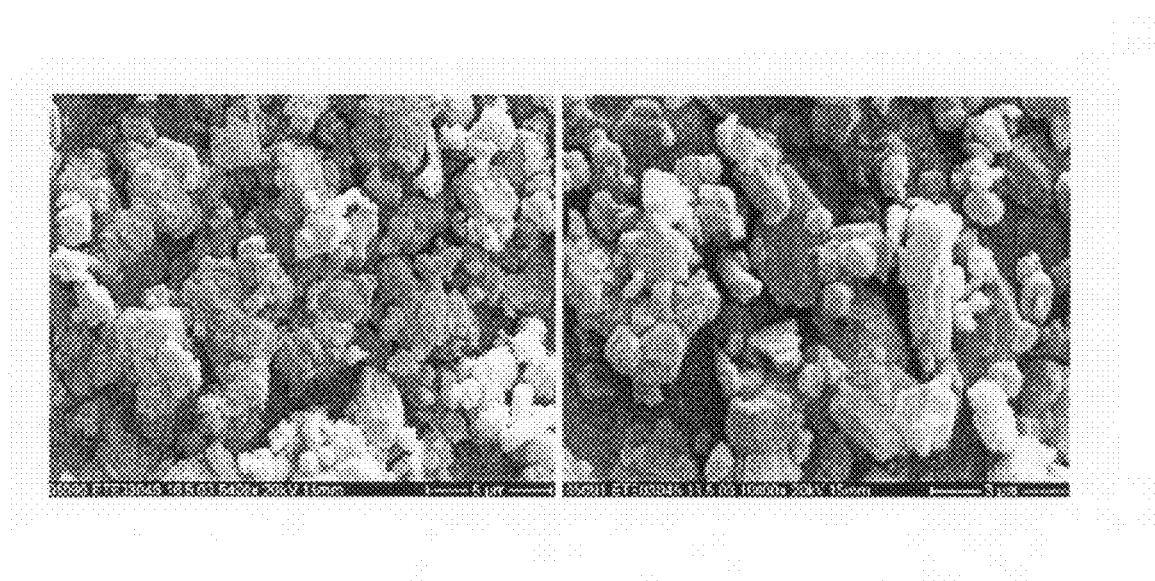
FIG. 3 shows electron microscope images of an ATH/Nanoclay mixture prepared according to the invention.

FILLER EXAMPLE 20 kg of a moist, viscous cake made of aluminium hydroxide (ATH) of filler type OL-104/LE from Martinswerk GmbH were introduced into a container. The solids content was 47 wt.-%. For liquefaction, 0.1 wt.-%, based on the solids content, of a polyacrylic acid salt was added accompanied by stirring. Enough Nanofil 5 type nanoclay from Süd-Chemie was added to this now-liquefied slurry for the weight ratio of ATH to Nanoclay to be 9:1, based on the solids content. A further addition of dispersants was not necessary in the case of this composition. The suspension was then mixed further for 15 minutes at room temperature. Drying of the filler mix according to the invention took place by means of a Niro spray dryer of the "Minor Preparation" type with a throughput of about 20 kg/h solid, the incoming-air temperature was about 500° C. and the outgoing-air temperature 120 to 130° C. The particle size distribution of this mixture was then measured with a Cilas 1064 laser spectrometer from Quantachrome. FIG. 2 shows the particle size distribution of the filler mix according to the invention. It can be seen that there is a monomodal particle size distribution here with only one maximum at ca. 2.2 μm. FIG. 3 shows electron microscope images of the ATH/Nanoclay mixture prepared according to the invention.

The mixtures described in the following were all prepared in a customary manner known to a person skilled in the art on a roll mill (type W150M from Collin). The roll mill, comprising two single rolls, was heated to about 150° C. The plastic granules were firstly placed on the roll mill, the two single rolls not yet rotating. The distance between the rolls was a few mm. The granules were thereby partly melted on. Then the rolls were slowly set in motion in opposite directions; a plastic skin now formed on one of the two rolls. When all the plastic granules were melted on, the solid additives were slowly added to the skin by means of a small scoop. The gap between the rolls was set such that a so-called roll bead formed between the two single rolls. The age-resister was added first, followed by the other mixture components. The liquid silane was previously trickled onto the plastic. (It could however alternatively also be added to the roll skin by means of a pipette). To achieve a good thorough mixing, the skin was repeatedly separated from the roll with a cutting device, rolled up and pressed again into the roll gap, so that a skin developed anew. The entire rolling process lasted 20 to 30 min.

After the preparation of the mixture on the roll mill, plastic sheets were prepared by means of a two-plate press, from which the testpieces needed for the further tests were punched out.

The following tests were carried out to obtain relevant test values/results:

Cone calorimeter data according to ASTM E 1354 at 35 kW/m² for 3 mm-thick sheets.

The "peak heat release rate" value is given here in kW/m² (abbreviation: PHRR; this is the maximum power output per surface unit which is measured in the cone calorimeter during combustion of the sample). The smaller the PHRR value the better the flame retarding of the sample.

The "time to ignition" value is also given in s (abbrev.: TTI; this is the time at which the sample begins to burn because of the heat radiation in the cone calorimeter). The higher the TTI value, the better the flame retarding of the sample.

The oxygen index (LOI value) according to ASTM D 2863 for test pieces 15 cm long, 2 mm thick and 50 mm wide. A higher LOI value shows a better flame retarding.

The UL94 V value for 3.2 mm-thick samples. According to the UL94-V standard this is classified as "not satisfied: NS", V 2 (better), V 1 (better still) or V 0 (highest classification).

COMPARISON EXAMPLE 396.9 g (=100 phr) Escorene Ultra UL00119 ethylene vinyl acetate (EVA) from ExxonMobil were processed on the above-mentioned Collin roll mill with 535.8 g (=135 phr) Martinal OL-104/LE aluminium hydroxide from Martinswerk GmbH together with 59.5 g (=15 phr) of Nanofil 15 nanoclay from Süd-Chemie and with 4.8 g (=1.2 phr) Ameo aminosilane from Degussa AG and 3.0 g (=0.75 phr) of the Ethanox 310 antioxidant from Albemarle Corporation at a roll temperature of 140° C. to produce a roll skin of 1000 g (=251.95 phr). The aminosilane brought about a better coupling of the filler to the polymer matrix.

EXAMPLE 396.9 g (=100 phr) Escorene Ultra UL00119 ethylene vinyl acetate (EVA) from ExxonMobil processed on the above-mentioned Collin roll mill with 595.4 g (=150 phr) of the spray-dried filler composition according to the invention consisting of 535.8 g (=135 phr) Martinal OL-104/LE aluminium hydroxide from Martinswerk GmbH and 59.5 g (=15 phr) Nanofil 15 nanoclay from Süd-Chemie together with 4.8 g (=1.2 phr) Ameo aminosilane from Degussa AG and 2.9 g (=0.75 phr) of the Ethanox 310 antioxidant from Albemarle Corporation at a roll temperature of 140° C. to produce a roll skin of 1000 g (=251.95 phr). The aminosilane brought about a better coupling of the filler to the polymer matrix.

The following table 1 gives the composition of the prepared formulations, the filler components in the comparison formulation having been added by "in-situ" mixing, i.e. the addition of the aluminium hydroxide and the nanoclay took place separately during the preparation of the mixture on the roll mill, whereas the filler mix according to the invention was prepared beforehand by spray drying:

TABLE 1

| Formulations | Comparison example | Example |
| --- | --- | --- |
| Quantity | Phr | Phr |
| EVA, 19% VA | 100 | 100 |
| ATH OL-104/LE | 135 | — |
| Nanoclay, Nanofil 15 | 15 | — |
| ATH/Nanoclay mixture (9:1) | — | 150 |
| Aminosilane, Ameo | 1.2 | 1.2 |
| Ethanox 310 | 0.75 | 0.75 |

Table 2 below gives the values ascertained, for the application example according to the invention and the comparison example, for TTI, PHRR, LOI and UL94V.

TABLE 2

|  | Comparison example | Example |
| --- | --- | --- |
| TTI (s) | 149 | 156 |
| PHRR (kW/m²) | 170 | 173 |
| LOI, 2 × 50 mm², (% $O_2$) | 34 | 34.2 |
| UL94V, 3.2 mm | V 0 | V 0 |

It is shown that the EVA mixture furnished with the flame retarding composition according to the invention displays no disadvantages, in terms of fire-protection properties, compared with the mixture prepared in-situ. All the numerical values are to be viewed as equal as measured-value spreads occurring within the framework of reproducibility; both mixtures also achieve a UL 94 V0 classification.

The invention claimed is:

1. A flame retarding composition comprising a mixture of a metal hydroxide component and a clay component, wherein the metal hydroxide component and the clay component together have a monomodal particle size distribution.

2. The flame retarding composition according to claim 1 characterized in that the metal hydroxide component comprises AlO(OH), Al(OH)$_3$(ATH) and/or Mg(OH)$_2$(MDH) individually or in any mixture.

3. The flame retarding composition according to claim 1 characterized in that the clay component comprises nanoclay material selected from bentonite and hectorite and modified materials prepared therefrom.

4. The flame retarding composition according to claim 3 wherein said modified materials prepare from said nanoclay material is organically intercalated materials.

5. The flame retarding composition according to claim 1 characterized in that the clay component content lies in the range from 0.5 wt. % to 90 wt. %.

6. The flame retarding composition according to claim 1 characterized in that the d$_{50}$ value of the particles of the metal hydroxide component used lies in the range from 0.2 μm to 100 μm.

7. The flame retarding composition according to claim 1 characterized in that the d$_{50}$ value of the particles of the clay component lies in a range from 0.2 μm to 100 μm.

8. The flame retarding composition to claim 1 characterized in that the d$_{50}$ value of both the metal hydroxide component and the clay component are in the range from 0.2 μm to 100 μm.

9. The flame retarding composition according to any of claims 1-8 characterized in that the metal hydroxide component comprises one or more i) aluminum hydroxides; ii) magnesium hydroxides; or iii) mixtures of aluminum and magnesium hydroxides.

10. A flame retarded polymer, characterized in that it comprises a polymer component and a flame retarding composition according to claim 9 or has been prepared using such a composition.

11. The flame retarded polymer product according to claim 10, characterized in that the polymer is selected from ethylene/vinyl acetate copolymers (EVA), ethylene/ethyl acrylate copolymers (EEA), ethylene/methyl acrylate copolymers (EMA) and polypropylene and its copolymers.

12. A flame retarded polymer, characterized in that it comprises a polymer component and a flame retarding composition according to claim 1 or has been prepared using such a composition.

13. The flame retardant polymer according to claim 12 wherein the polymer component is selected from thermoplastic or thermosetting resins.

14. The flame regarded polymer product according to claim 13 selected from polyolefins, polyesters, polyamides, polyvinyls, polyethers and rubbers, homo-, co- and terpolymers of the same and also mixes of such polymers being included in each case.

* * * * *